J. TAGGART.
Potato Digger.
No. 17,129.
Patented Apr. 21, 1857.
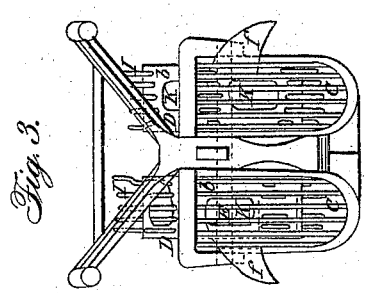
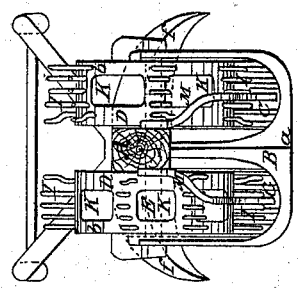
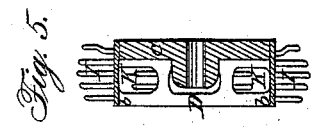
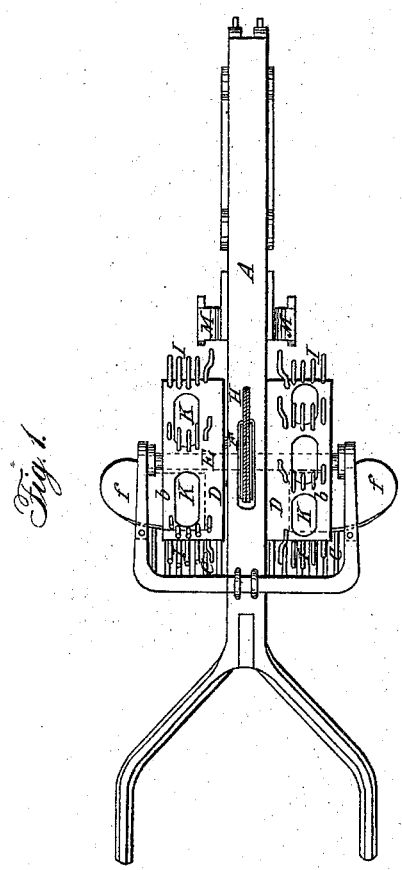
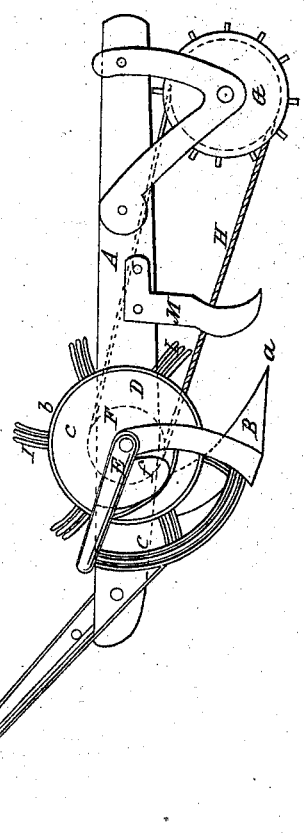

UNITED STATES PATENT OFFICE.

JOHN TAGGART, OF ROXBURY, MASSACHUSETTS, ASSIGNOR TO HIMSELF AND WM. W. MESSER.

IMPROVEMENT IN POTATO-DIGGERS.

Specification forming part of Letters Patent No. 17,129, dated April 21, 1857.

*To all whom it may concern:*

Be it known that I, JOHN TAGGART, of Roxbury, in the county of Norfolk and State of Massachusetts, have invented a new and useful or Improved Machine for Digging Potatoes or Various other Roots; and I do hereby declare that the same is fully described and represented in the following specification and the accompanying drawings, of which—

Figure 1 is a top view of such machine; Fig. 2, a side elevation of it; Fig. 3, a rear view of it; Fig. 4, a vertical section taken in front of its vine-clearer, and so as to exhibit them and the mechanism in rear of them. Fig. 5 is a vertical section of one of the lifter and discharging wheels.

In carrying out my invention I make use of a plow-beam, A, carrying a plow, B, whose nose is shown at $a$ in the drawings. In rear of this plow, or each wing of it, and so as to extend above the plow, as shown in Figs. 1, 2, and 3, I place a grid or grating, C, above which and over each plow-wing I arrange a lifter-wheel, D, the same being affixed on a horizontal shaft, E, extending transversely across the plow-beam and carrying a pulley, F. Around the said pulley and the grooved periphery of a toothed driving-wheel, G, disposed underneath the plow-beam and near its front end, as shown in the drawings, an endless band, H, is carried, the said shaft, during the forward movement of the plow or when the mechanism is drawn upon the surface of the ground, serving to put in revolution the lifter wheel or wheels D D, two of which are exhibited in the drawings, and as applied on opposite sides of the plow-beam. Each of the lifter-wheels consists in part of a cylindrical rim, $b$, and a disk, $c$, from one side of which said rim projects. Furthermore, there extends from the outer surface of said rim several sets of fingers or prongs, as shown at I I. The rim is constructed with a series of discharging-slots, K K, each of which is arranged directly between two sets of the fingers. Each finger should be so curved that during its entrance into and passage out of the ground—or, in other words, while it is being worked up the grid—it shall aid in holding or maintaining upon itself such potatoes or roots as may be lifted out of the ground by it.

Extending from within each lifter-wheel and in rear of its axle is a discharging-spout, $f$. Besides this there is placed in front of each lifter-wheel and its plow one or more vine-clearers or teeth, M M, the same being made to extend from the plow-beam, as shown in the drawings.

In using this machine for the purpose of plowing a potato-field and gathering its crop of potatoes it is to be drawn over the field in a manner analogous to that in which a common plow is operated, the plow-nose $a$ being run through a row of hills. While this is being done the lifter-wheels will be put in rotation, so as to seize and raise the earth and potatoes below them and force them up the grids or grates, the earth falling through the said grids or grates and the potatoes remaining within them and on the fingers of the lifter-wheels until such fingers are elevated into a position to cause the potatoes to fall through their slot or slots K and down upon the discharging-spout $f$, which may be under them, the potatoes, by such spout, being discharged upon the surface of the ground or into a basket suspended underneath the spout. In the meantime the vine-clearers, by being drawn against the vines on the surface, will gather up the same and prevent them from obstructing the action of the lifter wheel or wheels.

What I claim is—

The combination and arrangement of the plow, the grid or grate, the revolving-tooth lifter wheel or wheels, and the means of discharging the potatoes from the same.

In testimony whereof I have hereunto set my signature.

JOHN TAGGART.

Witnesses:
R. H. EDDY,
F. P. HALE, Jr.